US012695893B2

(12) United States Patent
Kumar et al.

(10) Patent No.: US 12,695,893 B2
(45) Date of Patent: Jul. 28, 2026

(54) OPTIMIZATION OF DIRECT MEMORY ACCESSES FOR REAL-TIME DATA STREAMING APPLICATIONS

(71) Applicant: NVIDIA Corporation, Santa Clara, CA (US)

(72) Inventors: Jitendra Kumar, Pune (IN); Tushar Khinvasara, Pune (IN); Bhushan Rupde, Pune (IN); Kaustubh Purandare, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 207 days.

(21) Appl. No.: 17/884,436

(22) Filed: Aug. 9, 2022

(65) Prior Publication Data

US 2024/0056589 A1 Feb. 15, 2024

(51) Int. Cl.
| | |
|---|---|
| *H04N 19/423* | (2014.01) |
| *H04L 65/65* | (2022.01) |
| *H04L 69/22* | (2022.01) |
| *H04N 19/169* | (2014.01) |
| *H04N 19/436* | (2014.01) |
| *H04N 19/70* | (2014.01) |

(52) U.S. Cl.
CPC ........... *H04N 19/423* (2014.11); *H04L 65/65* (2022.05); *H04L 69/22* (2013.01); *H04N 19/188* (2014.11); *H04N 19/436* (2014.11); *H04N 19/70* (2014.11)

(58) Field of Classification Search
CPC ....... H04L 65/65; H04L 69/22; H04N 19/188; H04N 19/423; H04N 19/436; H04N 19/70
See application file for complete search history.

(56) References Cited

U.S. PATENT DOCUMENTS

| | | | | |
|---|---|---|---|---|
| 2003/0095567 A1* | 5/2003 | Lo | ............................ | H04L 65/65 |
| | | | | 370/466 |
| 2020/0099600 A1* | 3/2020 | Kaplan | .................... | H04L 45/74 |
| 2020/0286203 A1* | 9/2020 | Amento | .............. | G06F 12/0835 |
| 2022/0150558 A1* | 5/2022 | Lee | ........................ | H04N 21/233 |
| 2022/0224746 A1* | 7/2022 | Li | .......................... | H04L 65/764 |

FOREIGN PATENT DOCUMENTS

| | | | | | |
|---|---|---|---|---|---|
| CN | 114840339 A | * | 8/2022 | ......... | G06F 13/4022 |

* cited by examiner

*Primary Examiner* — Maria E Vazquez Colon
(74) *Attorney, Agent, or Firm* — Lowenstein Sandler LLP

(57) ABSTRACT

Disclosed are apparatuses, systems, and techniques that improve memory and computational efficiency of remote direct memory accesses into a memory of a graphics processing unit. The techniques include but are not limited to receiving packets with video frame data, storing the plurality of packets in a memory of a network controller, processing the packets to obtain unit(s) of the video frame, storing the unit(s) representative of the video frame in a memory of a graphics processing unit (GPU), and extracting the data of the video frame from the units representative of the video frame, stored in the memory of the GPU, to render the video frame.

21 Claims, 5 Drawing Sheets

400

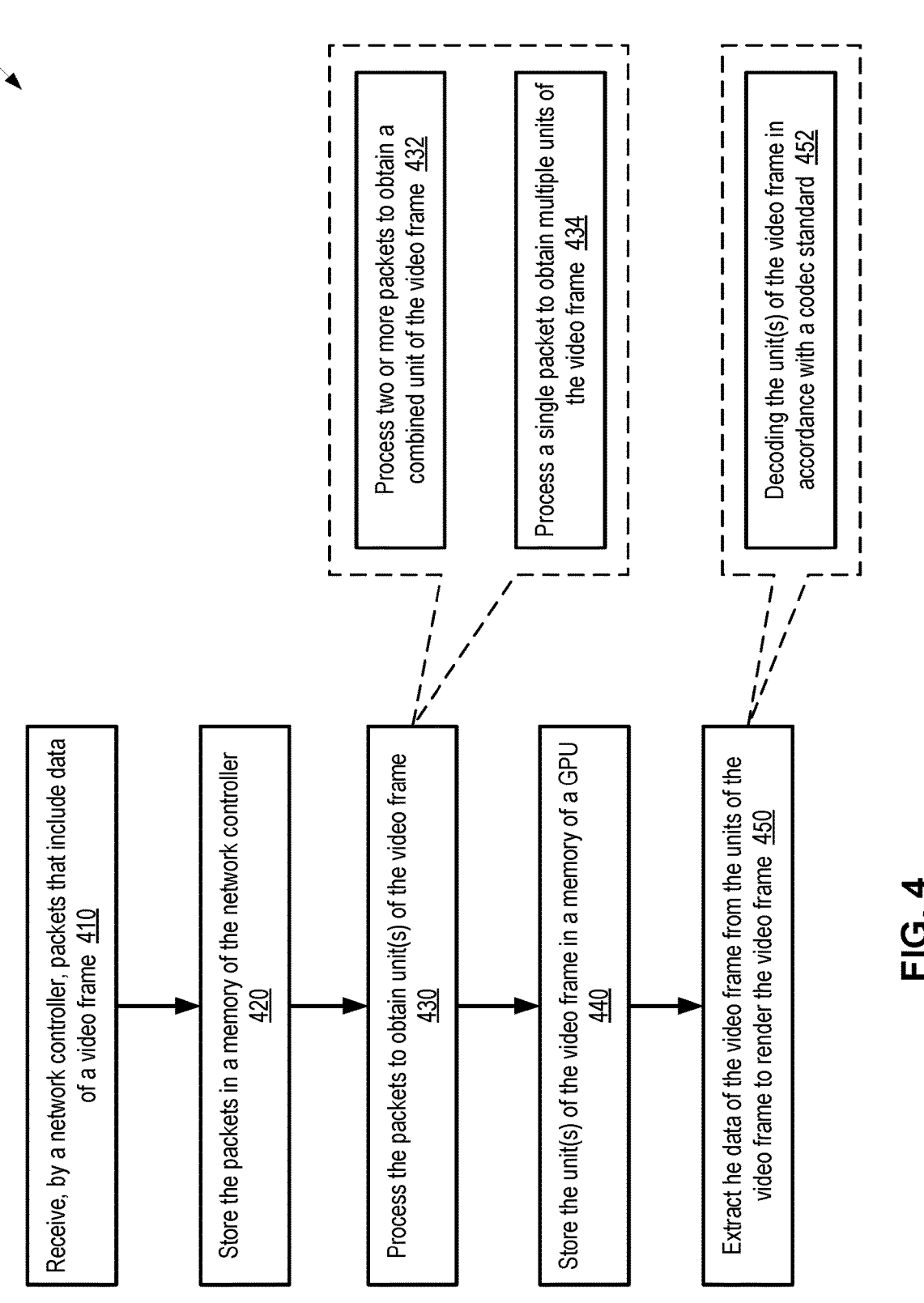

Receive, by a network controller, packets that include data of a video frame 410

Store the packets in a memory of the network controller 420

Process the packets to obtain unit(s) of the video frame 430

Process two or more packets to obtain a combined unit of the video frame 432

Process a single packet to obtain multiple units of the video frame 434

Store the unit(s) of the video frame in a memory of a GPU 440

Extract he data of the video frame from the units of the video frame to render the video frame 450

Decoding the unit(s) of the video frame in accordance with a codec standard 452

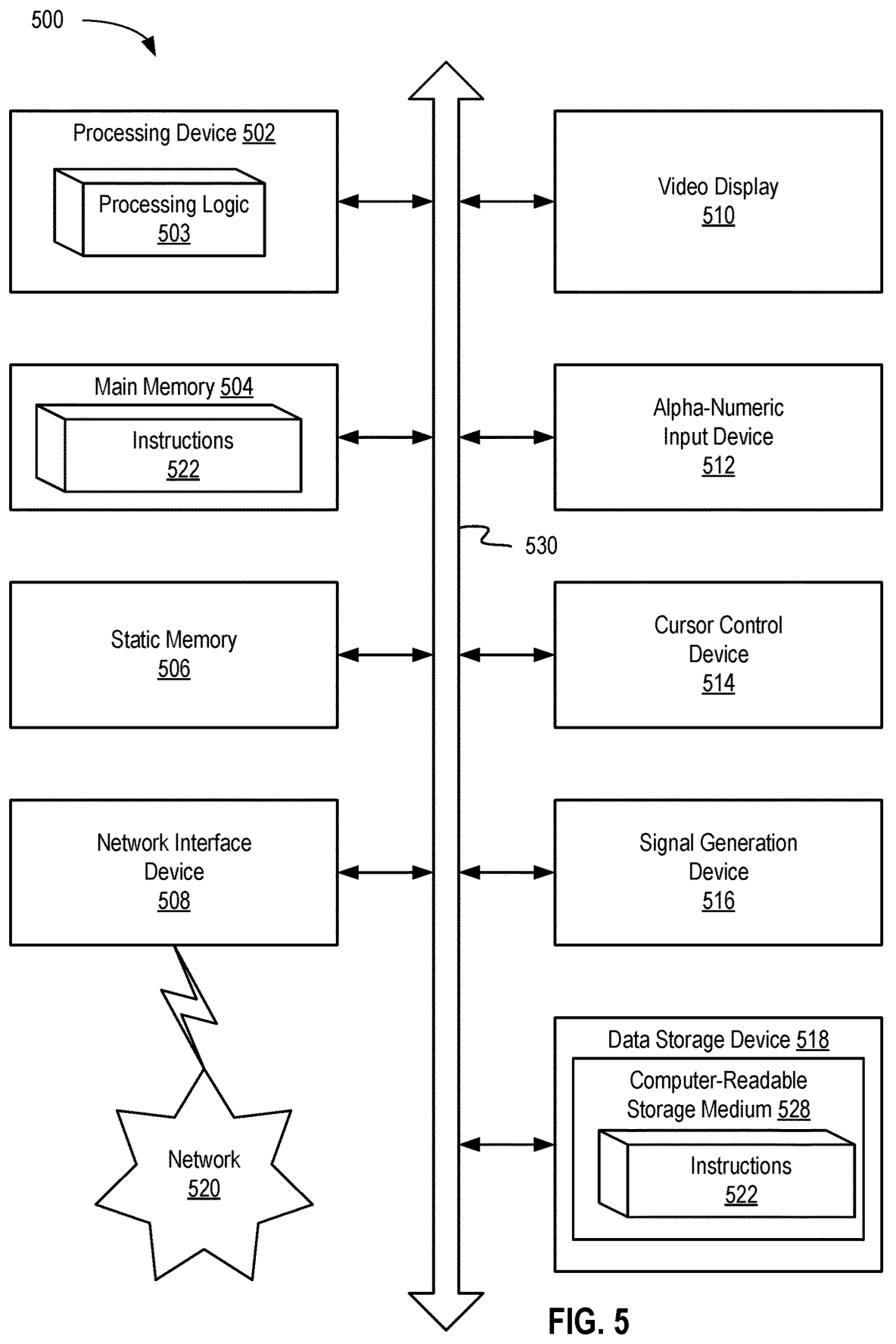

Processing Device 502

Processing Logic
503

Main Memory 504

Instructions
522

Static Memory
506

Network Interface
Device
508

Network
520

530

Video Display
510

Alpha-Numeric
Input Device
512

Cursor Control
Device
514

Signal Generation
Device
516

Data Storage Device 518

Computer-Readable
Storage Medium 528

Instructions
522

FIG. 5

OPTIMIZATION OF DIRECT MEMORY ACCESSES FOR REAL-TIME DATA STREAMING APPLICATIONS

TECHNICAL FIELD

At least one embodiment pertains to processing resources and techniques that are used to improve memory efficiency and decrease computational overhead in compressed data transmission. For example, at least one embodiment pertains to efficient storage and handling of data packets communicated over a network and processing of the data packets for use by graphics processing units (GPUs) in the course of GPU remote direct memory access (RDMA) operations.

BACKGROUND

GPU RDMA technology (e.g., GPUDirect RDMA) enables a direct path for data exchange between a GPU and a third-party device, such as (for example and without limitation) one or more of network interfaces, video acquisition devices, storage adapters, and other devices that support the Peripheral Component Interconnect Express (PCI Express) communication standard or similar standards and protocols. Peer devices communicating using GPU RDMA operations can share a physical address space. Each device has a number of registers that can be used for reads and writes by a peer device in the same way that the peer device performs these operations on the local system memory. GPU RDMA is often facilitated by an application programming interface (API) that supports verb-based operations (e.g., SEND, WRITE, READ, ATOMIC, etc.). The data transported between GPU RDMA devices can include video frames to be decoded and rendered by the GPU of the receiving device, e.g., for the benefit of a user of the receiving device.

BRIEF DESCRIPTION OF DRAWINGS

FIG. 2A illustrates conventional operations of GPU RDMA that utilizes system memory for storage of received packets. FIG. 2B illustrates memory-efficient operations of GPU RDMA in which the use of system memory for storage of received packets is eliminated, according to at least one embodiment;

FIG. 4 is a flow diagram of an example method of performing GPU remote direct memory access operations with memory-efficient packet processing, according to at least one embodiment;

FIG. 5 depicts a block diagram of an example computer device capable of enabling memory-efficient operations of GPU RDMA, in accordance with at least some embodiments of the present disclosure.

DETAILED DESCRIPTION

Figure 1:
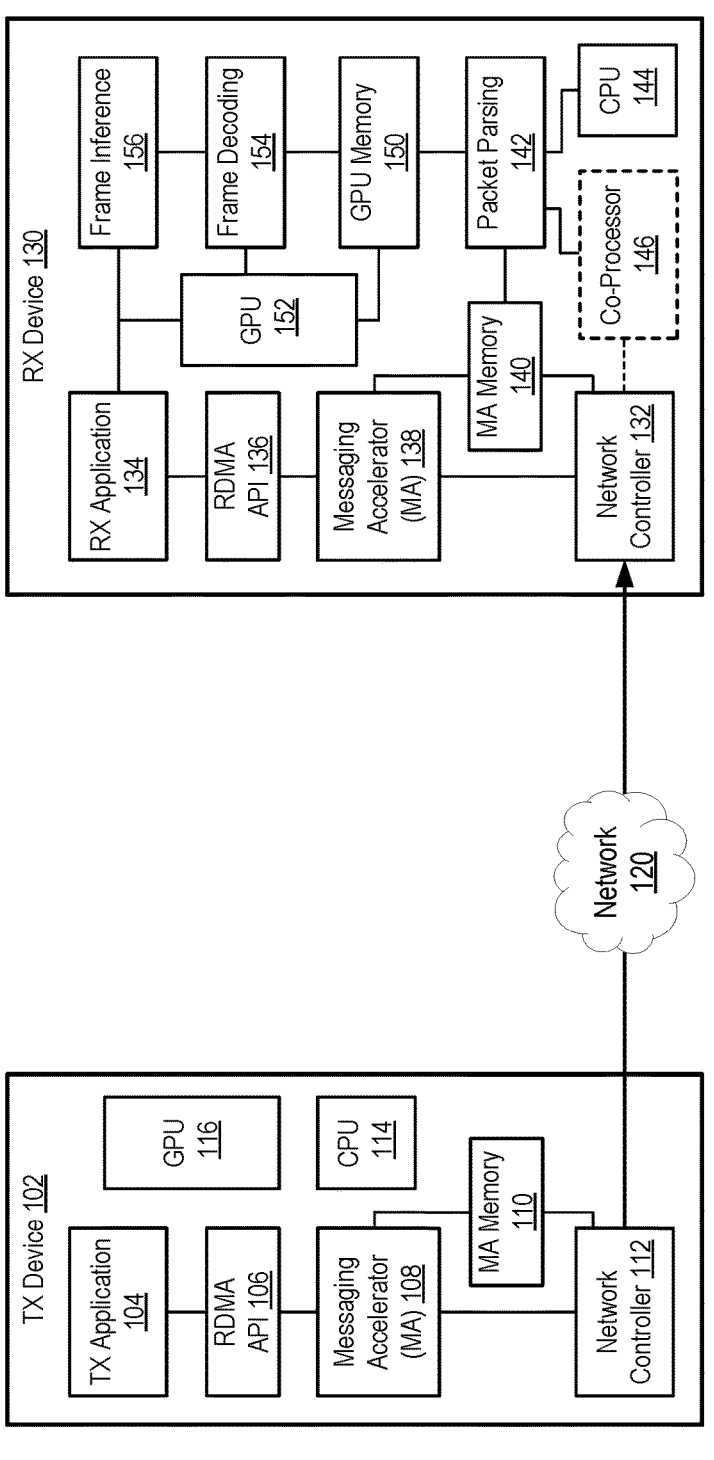
FIG. 1 is a block diagram of an example network architecture capable of implementing efficient GPU remote direct memory access operations, according to at least one embodiment.

Video codecs typically deploy a framework that includes a video coding level (VCL) and a network abstraction level (NAL). The VCL is used for efficient encoding (and decoding) of video frame data. NAL is used for formatting the encoded data and supplementing the formatted data with header information that facilitates storage and transmission of the data via various communication channels, including local channels, network channels, and the like. NAL can divide a video frame data into one or more NAL units (NALUs), the number or units can be dependent on a specific way the frame is rendered. Each NALU includes one or more bytes of a header information, which can include an indication of the type of data contained in the NALU (e.g., VCL data, parameters sets, delimiters, supplemental information, etc.), and a number of bytes of payload data of the type indicated by the header. Before transmitting NALUs of a particular video frame over a network, the NALUs are packetized into Real-time Transport Protocol (RTP) packets. RTP packets include RTP headers and NALU payloads. Whereas NALU sizes can be different for different frames and can even be different for the same frame, RTP packets are uniformly sized for meeting specific requirements of the relevant network communication protocols. In some instances, a single NALU can be packaged into a single RTP packet. In some instances, a single NALU can be fragmented into multiple RTP packets. Yet in other instances, multiple NALUs can be aggregated into a single RTP packet.

During a GPU RDMA data transmission, the received RTP packets can initially be stored in a memory component of a network controller (network interface card or NIC, network adapter, accelerator, etc.) that is directly connected to a network. The received RTP packets are then moved from the memory of the network controller to a destination GPU memory of the receiving device. However, before the data carried by the RTP packets can be used by the GPU of the receiving device for frame rendering, the RTP packets need to be unpacked to extract NALUs that can then be handled by the codec layers of the receiving device. Because, as described above, the correspondence of the RTP packets to the NALU payloads is not fixed, each RTP packet has to be individually unpacked, according to specific instructions encoded in a header of the corresponding RTP packet. In typical implementations, the unpacking is performed by a central processing unit (CPU) of the receiving device. Prior to the unpacking, the RTP packets are moved from the GPU memory to a system memory of the receiving device. The CPU then unpacks NALU payloads from the RTP packets and stores the extracted NALUs back in the GPU memory. The NALUs are then processed by the codec layers, which includes performing frame decoding, frame inferencing, applying filters, and the like.

The intermediate operations of moving the RTP packets from the GPU memory to the system memory and back to the GPU memory consume computational cycles and occupy a portion of the system memory that could have been used for other computational tasks. Furthermore, such back-and-forth transfers of the data increase latency and can be a bottleneck that prevents a user (e.g., a viewer of the video) from taking a full advantage of the data (e.g., resorting to watching the video in a lower resolution that the data potentially supports). Moreover, the involvement of the CPU in the unpacking of the RTP packets largely defeats the objective of direct memory transfers whose core purpose is to minimize or completely avoid such an involvement.

Aspects and embodiments of the instant disclosure address these and other technological challenges by disclosing methods and systems improve the processing of the live-streaming data, eliminate CPU involvement, reduce latency, and improve the overall efficiency of RDMA operations. More specifically, the instant disclosure provides for a GPU RDMA architecture in which received RTP packets may be stored in a memory of a network controller (NC) and unpacked while the packets are still in the NC memory, without the need to move the packets to the system memory. Unpacking the RTP packets to extract NALUs may be performed by loading the RTP packets to a parsing logic directly and then storing the extracted NALUs outputs in the GPU memory. Subsequent processing of the NALUs by the codec layers (e.g., frame decoding, frame inferencing, filtering, etc.) is then performed by retrieving the NALUs, decoded frames, and any other subsequent data from the GPU memory and storing various intermediate processing products in the GPU memory (e.g., in different buffers of the GPU memory). As a result, CPU involvement in the handling of the data is eliminated or significantly reduced. In some embodiments, the CPU may still perform the RTP packets unpacking (while the RTP packets are still stored in the NC memory). In other embodiments, unpacking may be performed by a dedicated co-processor of the NC, thus ensuring that the CPU takes no part in the video frame processing. In some embodiments, operations of the parsing logic may be performed responsive to instructions generated by an application library via a specialized application programming interface (API) that specifies how parsing of headers and data payloads of the RTP packets is to be performed and where the unpacked NALUs are to be stored.

The advantages of the disclosed techniques include but are not limited to minimizing or eliminating CPU involvement, releasing processing resources for additional tasks, reducing latency of real-time video frame processing, and the like. This improves quality and resolution of user-accessed services and increases the overall user satisfaction.
System Architecture FIG. 1 is a block diagram of an example network architecture 100 capable of implementing efficient GPU remote direct memory access operations, according to at least one embodiment. As depicted in FIG. 1, network architecture 100 may support operations of a transmitting (TX) device 102 connected, over network 120 with a receiving (RX) device 130. Network 120 can be a public network (e.g., the Internet), a private network (e.g., a local area network (LAN), or wide area network (WAN)), a wireless network, a personal area network (PAN), or a combination thereof. GPU RDMA operations may support transfer of data from a memory of TX device 102 directly to a GPU memory of RX device 130 without mediation by a CPU 144 of RX device 130.

TX device 102 can support one or more applications TX applications 104, which may be video streaming applications, gaming applications, neural network applications, or any other applications that are configured to take advantage of processing of data on a GPU (e.g., for efficient parallel processing). To facilitate memory transfers, a TX application 104 may post work requests, e.g., via an RDMA application programming interface (API) 106, to a send queue to and/or receive a queue from a messaging accelerator (MA) 108. MA 108 may include various routines, libraries, and any suitable dependencies that facilitate memory transfers of data. The data to be transmitted may be stored, e.g., in system memory (not shown in FIG. 1) and may be identified for RDMA transfer by TX application 104. MA 108 may be communicatively coupled to MA memory 110 and a network controller 112. MA memory 110 may include a flash memory, a static random access memory (SRAM), a dynamic random access memory (DRAM), such as synchronous DRAM, or any combination thereof. MA memory 110 may temporarily hold the data copied from the system memory of TX device as the held data is communicated, e.g., packet by packet, over network 120, from network controller 112 of TX device 102 to network controller 132 of RX device 130.

The data scheduled for transmission may be stored in the MA memory 110 in the form of RTP packets. More specifically, a central processing unit (CPU) 114 may process each frame marked by TX application 104 for RDMA transfer and may create one or more NALUs. Each NALU may include a data payload and an indication of the type of the data included in the NALU payload. The NALUs may have a variety of sizes, with each NALU size individually determined based on the size of the frame, a type of the encoding used to represent the frame (e.g. a frame with intra-frame encoding, inter-frame encoding, etc.), and so on. CPU 114 may further process the NALUs to generate RTP packets, which may have a size standardized for network transmission. Although frame processing, NALU processing, RTP(s) processing, etc., is referred to herein as being performed by CPU 114, in some embodiments, such processing may be performed by a dedicated co-processor. In some embodiments, the frames to be processed may reside not in the system memory of TX device 102, but in a GPU memory of a GPU 116. In some embodiments, some frames may reside in the system memory and some frames may reside in the GPU memory.

Each of network controller 112 and/or network controller 132 may be (or include) any combination of hardware components and firmware/software instructions stored thereon that enables RDMA operations and coordinates transmission and reception of data, and/or performing any other mediation between TX device 102 and RX device 130. Each of network controller 112 and/or network controller 132 may support one or more protocols, including (for example and without limitation): Transmission Control Protocol (TCP), Internet Protocol (IP), User Datagram Protocol (UDP), Converged Ethernet (RoCE) protocol, iWARP protocol, InfiniBand™ protocol, and the like. In some embodiments, network 120 may include any local bus connections, including but not limited to Peripheral Component Interconnect Express (PCIe) connection, a Compute Express Link (CXL) connection, or an NVLink connection, and the like. In some embodiments, network 120 may be implemented via local bus connections only.

Each of network controller 112 and/or network controller 132 may be (or include) a network interface card, a network adapter, and the like. Each of network controller 112/or and network controller 132 may include an RDMA adapter that performs packet processing of RTP packets. For example, network controller 112 may operate in accordance with a work queue established by TX application 104 and maintained by MA 108. Each RTP packet (or a group of RTP packets) may be associated with one or more destination addresses of a memory of RX device 130, e.g., one or more memory addresses in a GPU memory 150.

RTP packets may be received by network controller 132 of RX device 130 and may be temporarily stored in MA memory 140 of MA 138 of RX device 130. MA 138 may operate similarly to MA 108 of TX device 102. RDMA API 136 may facilitate interaction between one or more RX application(s) 134 instantiated on RX device 130 and MA 138. In some embodiments, RX device 130 may be a client device and RX application(s) 134 may be a client video streaming application or a gaming application receiving data from a subscription server, which may include TX device 102. In some embodiments, RX application 134 may be any other suitable application operating in conjunction with TX application 104. For example, TX application 104 may be a client application facilitating execution of neural network models on a GPU 152 of RX device 130, which operates as the remote server for TX application 104.

In some embodiments, RX application 134 or MA 138 may communicate completion messages to a completion queue of TX device 102 indicating which RDMA operations have been successful. In some embodiments, the data exchange between TX device 102 and RX device 130 may be bidirectional, with RX application 134 using GPU RDMA to store data directly to the GPU memory (not shown in FIG. 1) of TX device 102.

Network controller 132 may include any hardware components, or a collection of hardware components and firmware/software modules, that operate similarly to the components/module of network controller 112. RTP packets received through network controller 132 may be initially stored in MA memory 140. In existing GPU RDMA implementations, the received RTP packets are first moved to the destination GPU memory (e.g., GPU memory 150) from which the RTP packets are then moved to the system memory for CPU-based RTP□NALU parsing. In embodiments of the instant disclosure, packet parsing 142 occurs at an earlier stage, eliminating the need to copy the RTP packets to the system memory. More specifically, packet parsing 142 may operate directly on the received RTP packets while the RTP packets are still stored in MA memory 140. In some embodiments, packet parsing 142 may be performed by CPU 144. In some embodiments, packet parsing 142 may be performed by a dedicated co-processor 146 (deparsing accelerator). In some embodiments, co-processor 146 may be implemented as part of network controller 132. In some embodiments, co-processor 146 may be a reduced instruction set architecture processor, e.g., an ARM™ processor, a PowerPC™ processor, or any other suitable low-power processor.

Packet parsing 142 may read headers of one or more RTP packets, identify that the packets contain data associated with a particular NALU (or multiple NALUs), and generate NALU headers for the respective NALU(s). The obtained NALUs may be stored in GPU memory 150. Frame decoding 154 may then operate directly on NALUs in GPU memory 150 and may convert the NALUs into data frames, based on the information contained in the NALU headers. Data frames may be stored back in GPU memory 150, e.g., in a different buffer of GPU memory 150. Frame inference 156 module may then render the data frames for use by RX application 134. More specifically, frame inference 156 may include identifying the type of encoding of a given frame. For example, in some instances, a video frame may be encoded using a difference between the video frame and one or more other reference frames (in the inter-frame encoding mode). In other instances, a video frame may be encoded using one or more intra-frame encoding modes where various neighborhoods of the video frame are reconstructed from a certain set of pixels (e.g., boundary pixels for the neighborhood). Frame inference 156 may identify the sizes of such neighborhoods, e.g., 64×64 pixel blocks, 32×16 pixel blocks, 8×8 pixel blocks, and so on, and may further determine how each neighborhood is encoded (e.g., using an inter-frame mode or an intra-frame mode) and identify specific parameters for the encoding (e.g., boundary pixel intensities, motion vectors, etc.). Frame inference 156 may further identify applicable filters (e.g., constrained directional enhancement filters, deblocking filters, loop restoration filters, etc.) that are to be applied to various pixel blocks, and/or perform any other suitable operation consistent with a particular video compression standard used by TX application 104 to encode video data, e.g., H.264 (Advanced Video Coding) standard, H.265 (High Efficiency Video Coding) standard, AV1 (AOMedia Video 1) video compression standard, VP9 video compression standard, and so on. The rendered frames may then be made available to RX application 134. For example, the rendered frames may be displayed to a user of RX application 134.

Figures 2A, 2B:
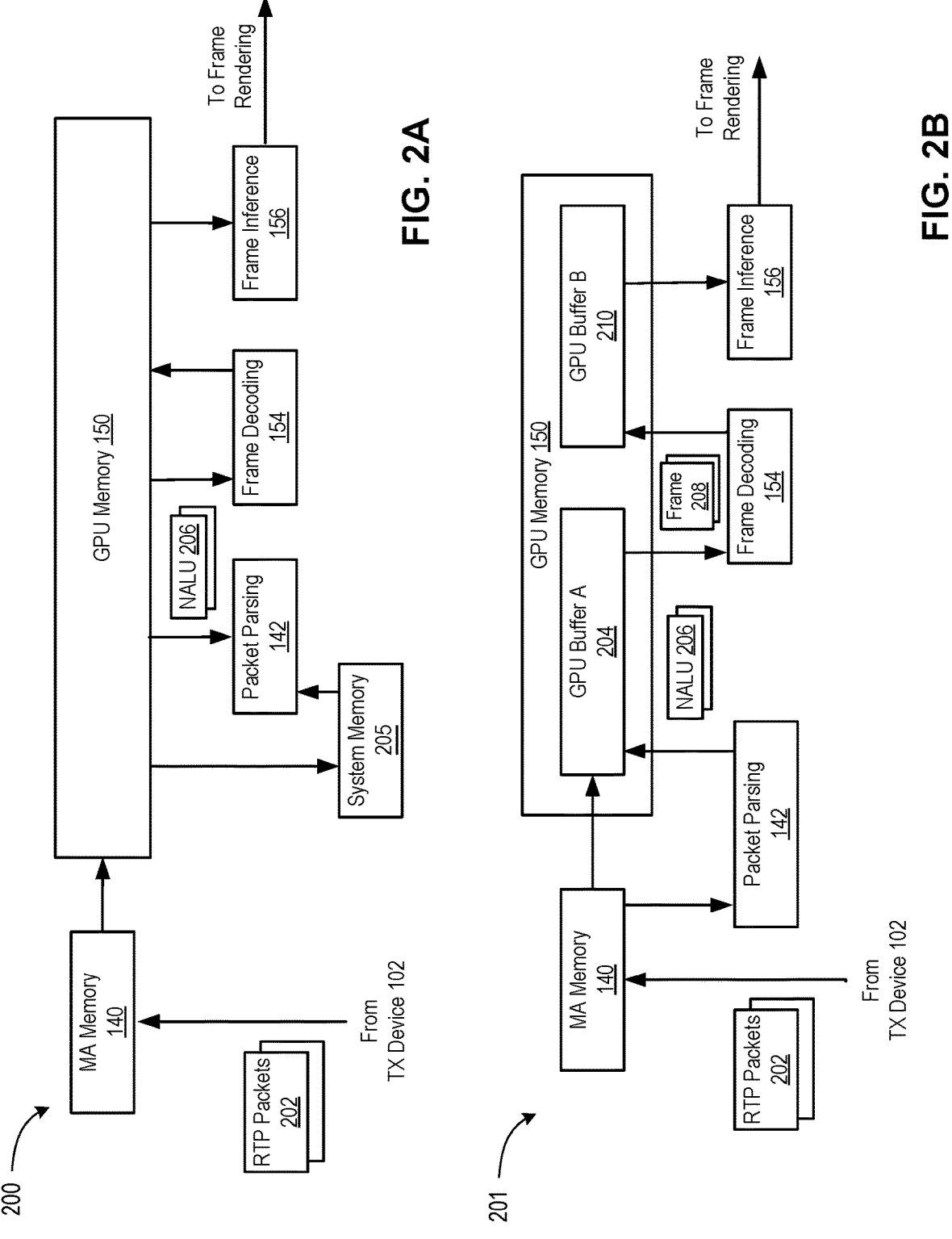
FIGS. 2A-B illustrate operations of GPU RDMA with memory-efficient packet processing, according to at least one embodiment.

FIGS. 2A-B illustrate operations of GPU RDMA with memory-efficient packet processing, according to at least one embodiment. FIGS. 2A-B illustrate operations performed by the receiving device, e.g., RX device 130. FIG. 2A illustrates conventional operations 200 of GPU RDMA that utilizes system memory for storage of received packets. FIG. 2B illustrates memory-efficient operations 201 of GPU RDMA in which the use of system memory for storage of received packets is eliminated, according to at least one embodiment.

As depicted in FIG. 2A, RTP packets 202 received from TX device 102 are initially stored in MA memory 140 of RX device 130. (The first numeral in FIGS. 2-3 indicates the figure in which the corresponding element is first depicted.) The RTP packets are then moved to GPU memory 150. In conventional implementations, RTP packets are then additionally moved to a system memory 205. The RTP packets then undergo packet parsing 142. Packet parsing generates NALUs 206 that are again stored in GPU memory 150. The NALUs 206 are then retrieved from GPU memory 150 for frame decoding 154. The decoded frames are stored back in GPU memory 150, from which the frames are taken for frame inference 156. After frame inference 156 has completed rendering, the rendered frames are provided to the consumer (e.g., user) of the data (e.g., developer, gamer, etc.).

Operations 200 illustrated in FIG. 2A waste processing time, processing power, system memory resources, bus (interconnect) bandwidth, and so on. FIG. 2B illustrates an improvement over FIG. 2A, by depicting memory-efficient operations 201 of GPU RDMA, in accordance with some embodiments of the present disclosure. In particular, in memory-efficient operations 201, the use of system memory 205 is eliminated. More specifically, RTP packets 202 received from TX device 102 may be initially stored in MA memory 140. MA memory 140 may be any memory accessible to network controller 132 of RX device 130. In some embodiments, MA memory 140 may be integrated on network controller 132, e.g., memory of the interface network card. In some embodiments, MA memory 140 may be a memory of RX device 130 communicatively coupled via a bus to network controller 132.

Received RTP packets 202 may be accessed by packet parsing 142 while RTP packets 202 still remain in MA memory 140. Packet parsing 142 may identify a header of each RTP packet 202. The header may determine a payload type, an identifier of the RTP payload (e.g., a place of the RTP payload within a sequence of RTP payloads related to a specific NALU), the timestamp of packing or transmission of the RTP packets 202, an identifier of the source of the RTP packet 202 (e.g., TX device 102, TX application 104, etc.), and any other relevant metadata. Packet parsing 142 may identify all RTP packets 202 that contain payloads of a particular NALU 206, generate a NALU payload, and add a NALU header (e.g., based on headers of the RTP packets 202) to the NALU payload. Packet parsing 142 may then store the generated NALU(s) 206 in GPU memory 150, e.g., in GPU buffer A 204.

The stored NALUs 206 may be retrieved from GPU memory 150 for frame decoding 154. Frame decoding 154 may identify a header of each NALU 206. The header may identify whether the respective NALU 206 includes a single frame, a portion of a single frame, or multiple frames. If frame decoding 154 identifies that NALU 206 includes a portion of a frame, frame decoding 154 may further identify other NALU(s) 206 that contain data of the corresponding frame and may combine the data from multiple NALUs 206 to generate a frame 208. If frame decoding 154 identifies that NALU 206 includes multiple frames, frame decoding 154 may partition that NALU's content among multiple frames 208. The decoded frames 208 may again be stored in GPU memory 150, e.g., in GPU buffer B 210. It should be understood that decoded frames 208 may still be coded in the codec sense, e.g., frames 208 may include instructions how to infer and render pixel data for display to the eventual user or consumer information rather than the actual pixel data (e.g., rather than RGB intensity values for each pixel of frame 208).

Frame inference 156 may then retrieve frame(s) 208 from GPU buffer B 210 and apply an appropriate codec decoder to render the actual frames. After frame inference 156, the rendered frames are provided to the consumer (e.g., user) of the data (e.g., developer, gamer, etc.).

Figures 3A, 3B:
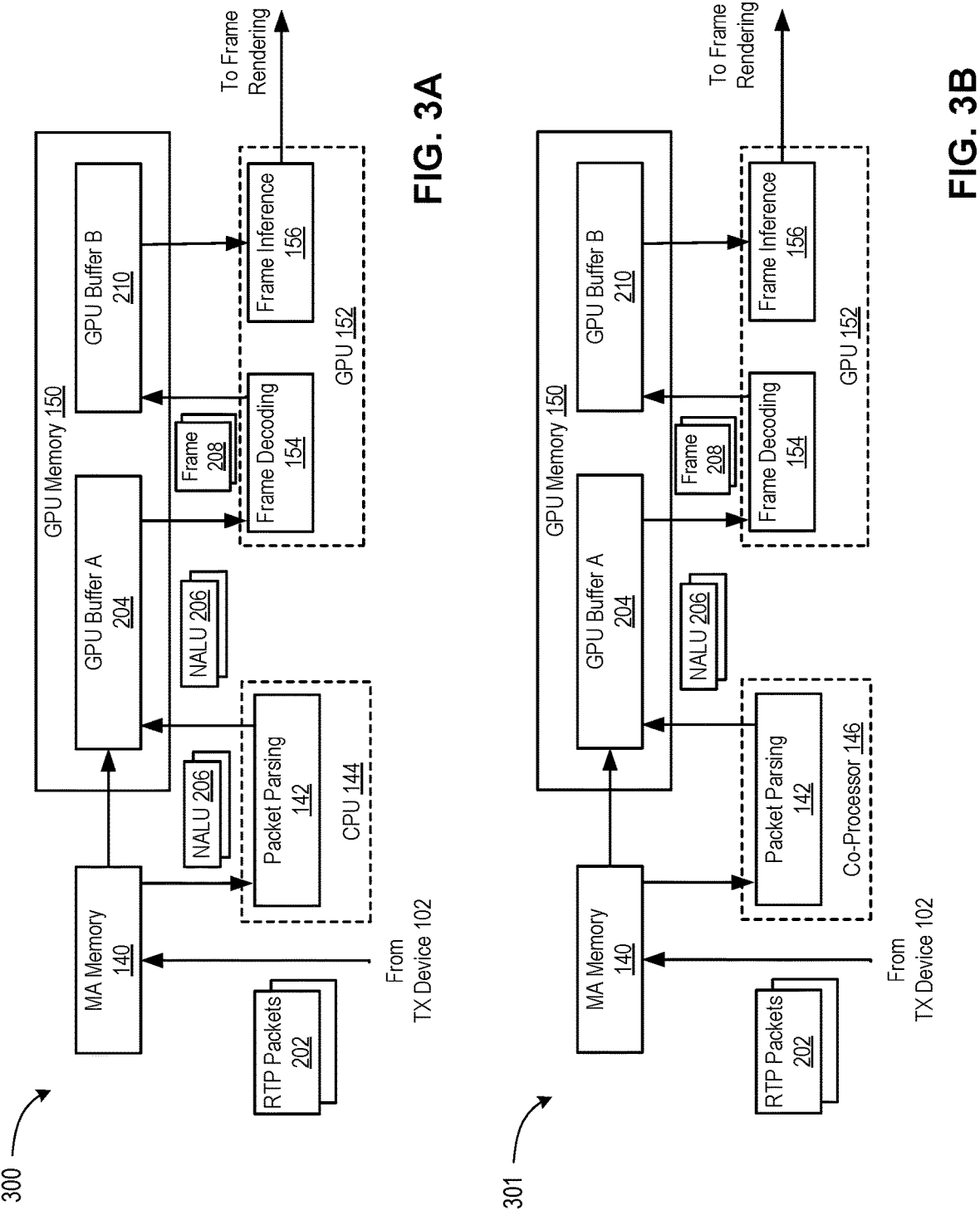
FIG. 3A illustrates one example implementation of memory-efficient operations of GPU RDMA, according to at least one embodiment.
FIG. 3B illustrates another implementation of memory-efficient operations of GPU RDMA, according to at least one embodiment.

FIG. 3A illustrates one example implementation 300 of memory-efficient operations 201 of GPU RDMA, according to at least one embodiment. Implementation 300 may be used with legacy RX devices 130 that lack an additional hardware infrastructure capable of facilitating fast performance of memory-efficient operations 201. More specifically, as indicated in FIG. 3A, packet parsing 142 may be executed by CPU 144 of RX device 130. In particular, CPU 144 may have access to MA memory 140 and may perform parsing of RTP packets 202 responsive to instructions from MA 108. In some embodiments, frame decoding 154 and frame inference 156 may be executed by GPU 152.

FIG. 3B illustrates another implementation 301 of memory-efficient operations 201 of GPU RDMA, according to at least one embodiment. Implementation 301 may be used with RX devices 130 that deploy additional hardware infrastructure, e.g., parsing co-processor 146, that facilitates faster performance of memory-efficient operations 201. More specifically, as indicated in FIG. 3B, packet parsing 142 may be executed by co-processor 146. In some embodiments, co-processor 146 may be integrated on network controller 112. Co-processor 146 may be a reduced instruction set computing microprocessor. In some embodiments, co-processor 146 can be integrated with MA memory 140 into an application-specific integrated circuit (ASIC). In some embodiments, co-processor 146 may be implemented as a field-programmable gate array (FPGA), which may further incorporate MA memory 140. Co-processor 146 may retrieve RTP packets 202 stored in MA memory 140, perform parsing of RTP packets 202, and store the obtained NALUs 206 in GPU memory 150. Subsequent operations may be performed as described above in conjunction with FIG. 2B and/or FIG. 3A.

FIG. 4 is a flow diagram of an example method 400 of performing GPU remote direct memory access operations with memory-efficient packet processing, according to at least one embodiment. Method 400 may be performed in the context of provisioning of streaming services, video monitoring services, computer-vision based services, artificial intelligence and machine learning services, mapping services, autonomous machine control or operation services, gaming services, databases services, online library services, cloud-based computing services, collaborative content creation for 3D assets services, virtual reality or augmented reality services, conversational AI services, digital avatar or human-machine interface services, and many other contexts, and/or in systems and applications for providing one or more of the aforementioned services. Method 400 may be performed by one or more processing units, e.g., CPUs, GPUs, co-processors, accelerators, or any combination thereof. The one or more processing units may include (or communicate with) one or more memory devices, e.g., memory of a network controller, GPU memory, system memory, and the like. In at least one embodiment, method 400 may be performed by processing units of RX device 130 of FIG. 1. In at least one embodiment, method 400 may be performed by multiple processing threads (e.g., CPU threads, co-processor threads, and/or GPU threads), each thread executing one or more individual functions, routines, subroutines, or operations of the method. In at least one embodiment, processing threads implementing method 400 may be synchronized (e.g., using semaphores, critical sections, and/or other thread synchronization mechanisms). Alternatively, processing threads implementing method 400 may be executed asynchronously with respect to each other. Various operations of method 400 may be performed in a different order compared with the order shown in FIG. 4. Some operations of method 400 may be performed concurrently with other operations. In at least one embodiment, one or more operations shown in FIG. 4 may not always be performed.

At block 410, processing units performing method 400 may receive a plurality of packets that include data of a video frame. The data of the video frame may be parsed, encoded, compressed, and/or otherwise processed in any suitable way, e.g., as may be prescribed by a compression standard that is being used. The packets may be communicated via a network (e.g., network 120), from a network controller (e.g., network controller 112) of a transmitting device (e.g., TX device 102) to a network controller (e.g., network controller 132) of a receiving device (e.g., RX device 130). The packets may be communicated as part of an interaction between an application operating on the transmitting device (e.g., TX application 104 on TX device 102) to an application operating on the receiving device (e.g., RX application 134 on RX device 130). The plurality of packets may include Real-time Transport Protocol (RTP) packets.

At block 420, processing units performing method 400 may store the plurality of packets in a memory of the network controller (e.g., network controller 132). The memory of the network controller should be understood as a memory that is physically located on the network controller (e.g., on the network interface card) or any memory that is communicatively coupled to the network controller and is different from the main system memory. In some embodiments, the memory of the network controller may be integrated into a microprocessor of the network controller.

At block 430, processing units performing method 400 may process the plurality of packets to obtain one or more units representative of the video frame. In some embodiments, the one or more units representative of the video frame may be H.264 network abstraction layer units (NALUs). In some embodiments, the one or more units representative of the video frame may be H.265 NALUs. In some embodiments, the one or more units representative of the video frame may be VP9 or AV1 Open Bitstream units (OBUs). Similarly, the one or more units representative of the video frame may include NALU(s) or similar unit created in accordance with any other video compression standard.

In some embodiments, processing the plurality of packets to obtain one or more units representative of the video frame may be performed by a co-processor (e.g., microprocessor) of the network controller. In some embodiments, processing the plurality of packets may be performed by a parsing logic, responsive to instructions provided by any suitable application library via an application programming interface (e.g., RDMA API 136). In some embodiments, the parsing logic can be implemented on the co-processor. In some embodiments, the parsing logic can be implemented as one or more software processes executed by a CPU of the receiving device (e.g., CPU 144). The instructions provided through the API may include prescriptions for parsing of headers and data payloads of the plurality of packets and assembling NALUs (both NALU headers and NALU data) from the parsed packets.

In some embodiments, as illustrated with the top callout portion in FIG. 4, processing the plurality of packets may include various compound operations, such aggregation of packets, fragmentations of packets, and the like. More specifically, if an aggregation operation is being performed (at block 432), two or more packets of the plurality of packets may be processed together to obtain a combined unit representative of the video frame. The combined unit may include a unit header (e.g., NALU header) generated based on the headers of at least two (or each) of the two or more packets. The payload of the combined unit may be obtained by combining data payloads of the two or more packets. If a fragmentation operation is being performed (at block 434), a subset of the one or more units representative of the video frame may be obtained by processing a single packet of the plurality of packets. The subset may include two, three, or more units (e.g., NALUs). A unit header of at least one (or each) unit of the subset may be generated based on a header of the single packet. The data payload of at least one (or each) unit of the subset may be obtained by splitting the data payload of that single packet.

At block 440, method 400 may continue with the processing units storing the one or more units representative of the video frame in a memory of a GPU (e.g., GPU memory 150). At block 450, the processing units may extract the data of the video frame from the one or more units representative of the video frame, stored in the memory of the GPU. In some embodiments, extraction of the data may be performed by the GPU (e.g., GPU 152). The extracted data may then be used to render the video frame.

In some embodiments, as illustrated with the bottom callout portion in FIG. 4, extracting the data of the video frame may include, at block 452, decoding the one or more units representative of the video frame in accordance with a codec standard that is used to encode the data of the video frame.

FIG. 5 depicts a block diagram of an example computer device 500 capable of enabling memory-efficient operations of GPU RDMA, in accordance with at least some embodiments of the present disclosure. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 500 can include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which can communicate with each other via a bus 530.

Processing device 502 (which can include processing logic 503) represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 can be configured to execute instructions executing method 400 of performing GPU remote direct memory access operations with memory-efficient packet processing.

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the present disclosure, executable instructions 522 can comprise executable instructions executing method 400 of performing GPU remote direct memory access operations with memory-efficient packet processing.

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving, using a network controller of a first device, from a second device remote to the network controller of the first device and executing a remote direct memory access operation to a graphics processing unit (GPU) of the first device (GPU RDMA operation) a plurality of packets comprising data of a video frame, wherein the plurality of packets are associated, by the second device, with at least one memory address of a memory of the GPU, and wherein the network controller is configured to perform packet-to-video frame processing;

storing the plurality of packets using a memory of the network controller;

processing, using the network controller, the plurality of packets to obtain one or more units representative of the video frame;

completing the GPU RDMA operation by storing the one or more units representative of the video frame in the memory of the GPU; and extracting, using the GPU, the data of the video frame from the one or more units representative of the video frame stored in the memory of the GPU to render the video frame.

2. The method of claim 1, wherein one or more packets of the plurality of packets comprise Real-time Transport Protocol (RTP) packets.

3. The method of claim 1, wherein the one or more units representative of the video frame comprise at least one of an H.264 network abstraction layer unit (NALU), an H.265 NALU, an AV1 Open Bitstream unit (OBU), or a VP9 OBU.

4. The method of claim 1, wherein processing the plurality of packets comprises:

processing two or more packets of the plurality of packets to obtain a combined unit representative of the video frame, wherein the combined unit comprises a unit header generated based at least on headers of at least two packets of the two or more packets, and wherein a data payload of the combined unit is obtained by combining data payloads of the at least two packets.

5. The method of claim 1, wherein a subset of the one or more units representative of the video frame is obtained by processing a single packet of the plurality of packets, wherein a unit header of at least one unit of the subset is generated based at least on a header of the single packet, and wherein a data payload of the at least one unit of the subset is obtained by splitting a data payload of the single packet.

6. The method of claim 1, wherein processing the plurality of packets to obtain one or more units representative of the video frame is performed using a coprocessor of the network controller.

7. The method of claim 1, wherein extracting the data of the video frame comprises:

decoding the one or more units representative of the video frame in accordance with a codec standard used to encode the data of the video frame.

8. The method of claim 1, wherein processing the plurality of packets is performed responsive to instructions for parsing of headers and data payloads of the plurality of packets, wherein the instructions are provided to a parsing logic from an application library via an application programming interface (API).

9. A system comprising:

a graphics processing unit (GPU) comprising:

a GPU memory;

a network controller (NC) configured to perform packet-to-video frame processing and coupled to the GPU memory, the NC comprising:

an NC memory; and a processing device, communicatively coupled to the NC memory, the processing device to:

receive, using the NC, from an external device remote to the NC, executing a remote direct memory access operation to the GPU (GPU RDMA operation), a plurality of packets comprising data of a video frame, wherein the plurality of packets are associated, by the external device, with at least one memory address of the GPU memory;

store the plurality of packets using the NC memory;

process the plurality of packets to extract one or more units representative of the video frame; and complete the GPU RDMA operation by storing the one or more units representative of the video frame in the GPU memory, wherein the GPU is to:

render the video frame using the one or more units representative of the video frame stored in the GPU memory.

10. The system of claim 9, wherein one or more packets of the plurality of packets comprise Real-time Transport Protocol (RTP) packets.

11. The system of claim 9, wherein the one or more units representative of the video frame comprise at least one of an H.264 network abstraction layer unit (NALU), an H.265 NALU, an AV1 Open Bitstream unit (OBU), or a VP9 OBU.

12. The system of claim 9, wherein to process the plurality of packets, the processing device is to:

obtain a combined unit representative of the video frame, wherein the combined unit comprises a unit header generated based on headers of each of two or more packets of the plurality of packets, and wherein a data payload of the combined unit is obtained by combining data payloads of the two or more packets.

13. The system of claim 9, wherein to extract a subset of the one or more units representative of the video frame, the processing device is to:

process a single packet of the plurality of packets;

generate a unit header of at least one unit of the subset based on a header of the single packet; and split a data payload of the single packet to obtain a data payload of the at least one unit of the subset.

14. The system of claim 9, wherein to render the video frame, the GPU is to decode the one or more units representative of the video frame in accordance with a codec standard used to encode the data of the video frame.

15. The system of claim 9, wherein the processing device is to process the plurality of packets responsive to instructions for parsing of headers and data payloads of the plurality of packets, wherein the instructions are provided from an application library via an application programming interface (API).

16. A system comprising:

one or more processing devices to:

receive, via a network controller, from an external device remote to the network controller executing a remote direct memory access operation to a graphics processing unit (GPU) of the system (GPU RDMA operation), a plurality of packets comprising data of a video frame, wherein the plurality of packets are associated, by the external device, with at least one memory address of a memory of the GPU, and wherein the network controller is configured to perform packet-to-video frame processing;

store the plurality of packets using a memory of the network controller;

process, using the network controller, the plurality of packets to obtain one or more units representative of the video frame;

complete the GPU RDMA operation by storing the one or more units representative of the video frame in the memory of the GPU; and extract, using the GPU, the data of the video frame from the one or more units representative of the video frame stored using the memory of the GPU to render the video frame.

17. The system of claim 16, wherein one or more packets of the plurality of packets comprise Real-time Transport Protocol (RTP) packets.

18. The system of claim 16, wherein the one or more units representative of the video frame comprise at least one of an H.264 network abstraction layer unit (NALU), an H.265 NALU, an AV1 Open Bitstream unit (OBU), or a VP9 OBU.

19. The system of claim 16, wherein to process the plurality of packets, the one or more processing devices are to:

obtain a combined unit representative of the video frame, wherein the combined unit comprises a unit header generated based on headers of at least two packets of the plurality of packets, and wherein a data payload of the combined unit is obtained by combining data payloads of the at least two packets.

20. The system of claim 16, wherein to extract a subset of the one or more units representative of the video frame, the one or more processing devices are to:

process a single packet of the plurality of packets;

generate a unit header of at least one unit of the subset based on a header of the single packet; and split a data payload of the single packet to obtain a data payload of the at least one unit of the subset.

21. The system of claim 16, wherein the system comprises at least one of:

a system to provide streaming services;

a system to provide video monitoring services;

a system to provide computer-vision based services;

a system to provide artificial intelligence and machine learning services;

a system to provide mapping services;

a system to provide autonomous machine control or operation services;

a system to provide online gaming services;

a system to provide database services;

a system to provide online library services;

a system to provide cloud-based computing services;

a system to provide content creation for 3D assets services;

a system to provide conversational AI services;

a system to provide virtual reality or augmented reality services;

a system to provide digital avatar services; or a system to provide human-machine interface services.

* * * * *